Patented Sept. 19, 1922.

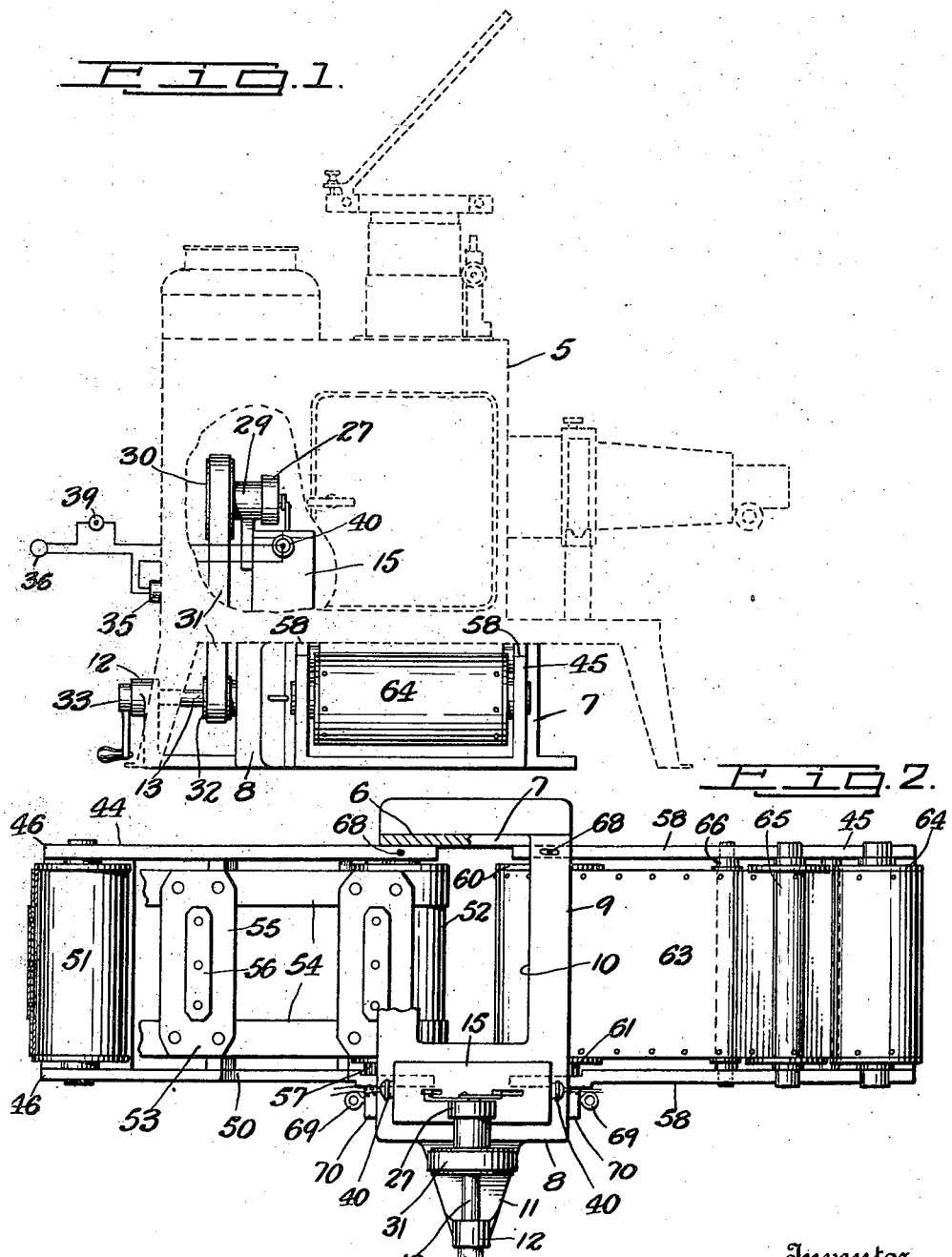

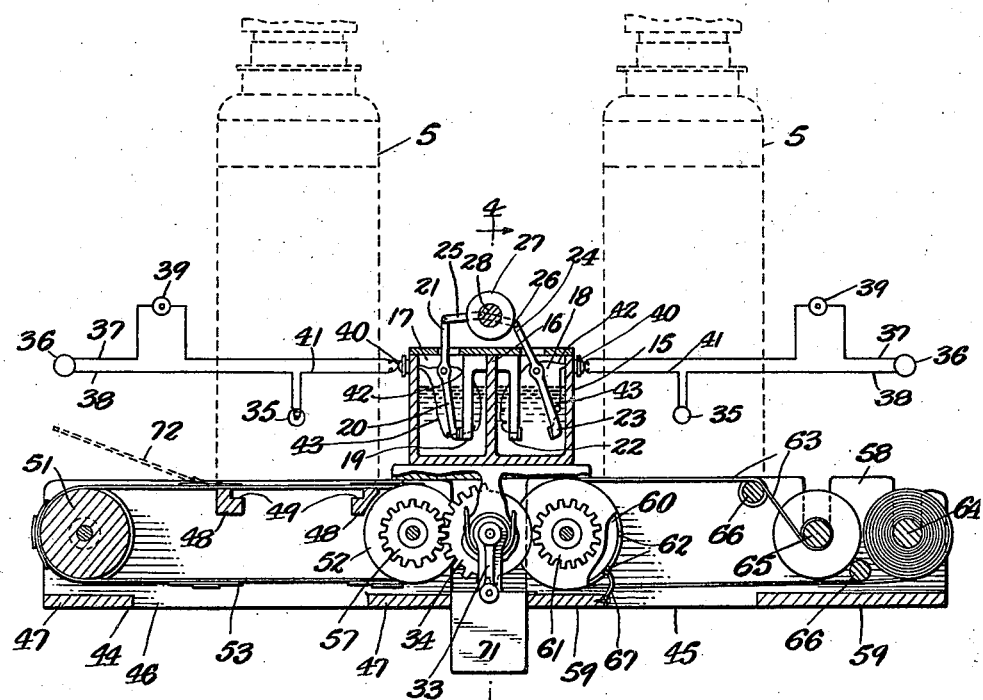
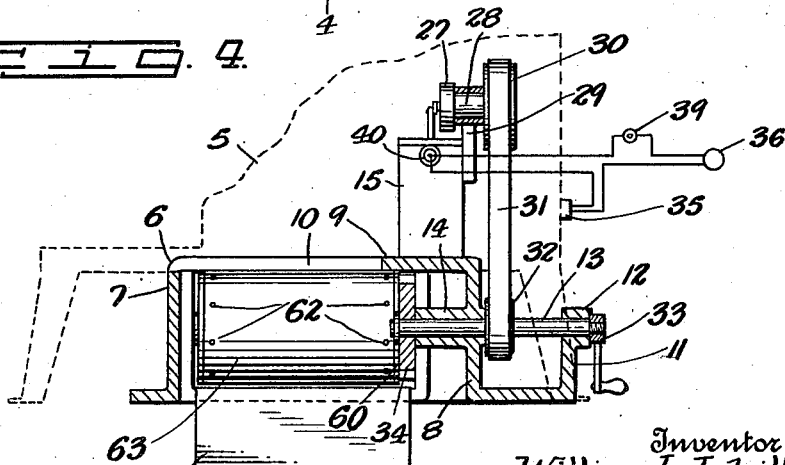

1,429,244

UNITED STATES PATENT OFFICE.

WILLIAM L. ISBILLS, OF ELIZABETH, NEW JERSEY.

PROJECTOR LANTERN.

Application filed March 27, 1920. Serial No. 369,255.

*To all whom it may concern:*

Be it known that I, WILLIAM L. ISBILLS, a citizen of the United States, and residing at Elizabeth, in the county of Union and State of New Jersey, have invented certain new and useful Improvements in Projector Lanterns, of which the following is a specification, such as will enable those skilled in the art to which it appertains to make and use the same.

This invention relates to projector lanterns and particularly to apparatus of this class designed to be used for the purpose of projecting opaque pictures or objects onto a screen as well as lantern slides for exhibition or other purposes, and the invention more particularly relates to an apparatus employed in connection with projector lanterns of the class specified for bringing opaque pictures or other objects in position to be projected; and the object of the invention is to provide a combination apparatus of the class specified which is designed to exhibit independent opaque pictures or the like mounted on an endless holder and carrier and also to exhibit panoramic pictures; a further object being to provide means whereby the pictures on the endless holder and carrier may be alternately exhibited with the separate panoramic pictures; a further object being to provide means for dissolving the pictures in the operation of projecting the same or, in other words, to gradually cause one picture to disappear on the screen as the next picture gradually appears thereon; and with these and other objects in view the invention consists in an apparatus of the class and for the purpose specified which is simple in construction and operation and efficient in use, and which is constructed and operated as hereinafter described and claimed.

The invention described and claimed herein is an improvement on that described and claimed in Letters Patent of the United States granted to me March 12, 1918, No. 1,258,905 and March 26, 1918, No. 1,260,673, and is fully disclosed in the following specification, of which the accompanying drawings form a part, in which the separate parts of my improvement are designated by suitable reference characters in each of the views, and in which:—

Fig. 1 is a side view of my improved apparatus and indicating the method of its use in connection with a projector lantern;

Fig. 2 a plan view of my improved apparatus with part of the construction broken away and in section;

Fig. 3 a back view of my improved apparatus with parts of the construction broken away and in section; and, Fig. 4 a partial section on the line 4—4 of Fig. 3.

In Figs. 1, 3 and 4 of the drawing I have indicated in dotted lines projector lanterns 5, two of which are shown in Fig. 3 of the drawing, and these lanterns are of the class designed to project both opaque pictures or objects as well as lantern slides, and particularly such machines as are known in the art, but my invention is not limited to any specific form or construction of projector machines, and these lanterns are merely indicated to clearly illustrate one use of my invention.

In practice, I provide a main frame 6 consisting of front and back walls 7 and 8 joined by a top wall 9 provided with a central opening 10. The back wall 8 is provided with a backwardly directed extension 11, having an upwardly directed bearing 12 through which a shaft 13 passes, and said shaft also passes through a bearing 14 on the back wall 8.

Mounted on top of the main frame 6 at the rear end portion thereof is a box member 15 divided by a partition wall 16 into separate chambers 17 and 18, each of which is filled, or partially filled, with a solution of water and salt. Mounted in the chamber 17 is a stationary contact member 19 and a pivoted contact member 20, having an upwardly directed extension 21. Mounted in the chamber 18 is a stationary contact member 22 and a pivoted contact member 23 having an upwardly directed extension 24. The extensions 21 and 24 project through the top of the box member 15 and are provided with links 25 and 26 respectively, both of which are pivoted to the face of a disk 27 secured to a shaft 28 mounted in a suitable bearing 29 at the top of the box member 15.

A pulley wheel 30 is secured to the shaft 28 and around which a belt 31 passes, said belt also passing around another pulley wheel 32 secured to the shaft 13, as clearly shown in Fig. 4 of the drawing. The rear end of the shaft 13 is provided with a crank handle 33 whereby said shaft may be rotated, and secured to the inner end of said shaft, within the main frame 6, is a segmental gear 34.

Each of the projector lanterns 5 is provided with an electric plug 35 placed in connection with a source of electrical supply through plugs or similar members 36 with which the circuit wires 37 and 38 are connected, and the plugs 35 are also in circuit with the lamps of the lanterns. In the construction shown, the circuit wire of each of the plugs 36 are connected with the plugs 35 and the other circuit wires 37 are provided with suitable switch devices 39 and connect with plugs 40 mounted in the side walls of the box member 15, and other wires 41 are connected with the plugs 40 and the plugs 35. Other circuit wires 42 are in circuit with the plugs 40 and are connected with the stationary contact members 19 and 22 respectively, and similar circuit wires 43 are in circuit with the plugs 40 and are connected with the movable contact members 20 and 23 respectively.

It will be seen from the foregoing that the making and breaking of the circuit between the contact members 19—20 and 22—23 will control the lights or electric lamps in the separate projector lanterns 5 to produce the dissolving feature hereinafter described.

Detachably mounted in connection with the opposite sides of the main frame 6 are supplemental frames 44 and 45, and the frame 44 consists of two side members 46 joined at the opposite ends thereof by bottom plates 47 and approximately, centrally of the top thereof by transverse strips 48 grooved at the top as shown at 49 to receive a picture frame, or the like, as hereinafter described. The groove 49 opens outwardly through an aperture 50 in one of the sides 46 of the supplemental frame 44.

Rotatably mounted in the end portions of the supplemental frame 44 are flanged rollers 51 and 52 over and around which an endless picture holder and carrier 53 passes, said holder and carrier being preferably of a construction similar to that shown in the patents hereinbefore referred to, and comprising side belt members 54 joined at intervals by transverse card or picture receiving and holding members 55 and 56. The flanged roller 52 is provided at one side thereof with a gear 57 which meshes with the segmental gear 34 on the shaft 13.

The supplemental frame 45 is composed of side members 58 joined at the ends thereof by bottom plates 59 and rotatably mounted on the inner end of the supplemental frame 45 is a flanged roller 60 having a gear 61 at one end thereof, which is adapted to mesh with the segmental gear 34, and the periphery of the roller 60 is provided adjacent to the end flanges thereof with a plurality of spaced projecting pins 62 which register with corresponding apertures formed in a panoramic picture strip or film 63, which is normally wound on a spool 64 detachably mounted in the free end portion of the frame 45, and which is adapted to be wound onto a spring-operated spool or roller 65 detachably mounted in said frame inwardly of the spool 64. Guide rollers 66 are also mounted in this frame between the side members 58 thereof and serve to hold the strip or film 63 in proper position. A spring catch device 67 is connected with the bottom 59 at the inner end of the frame 45 and operates in connection with one series of the pins 62 to hold the roller 60 against rotation by the action of the spring roller 65, but which will permit of the rotation of said roller 60 by means of the gears 30 and 61.

The supplemental frames 44 and 45 are detachably connected with the main frame 6 by pins 68 passed through the main frame and into the supplemental frames, or one of the side members of each of said frames and by other pins 69 passed through extensions 70 on the other side members of said supplemental frames and into the main frame 6. My invention is not limited to the specific means shown for connecting the supplemental frames with the main frame and any suitable means may be provided for accomplishing this result, and by permitting of the detachment of said frames, the apparatus, as a whole, may be compactly packed together in carrying it about from place to place or in the shipment of the same.

A box-shaped receiver 71 is mounted between the inner or abutting ends of the supplemental frames 44 and 45 and extends below said frames as shown in Figs. 3 and 4 and into which the pictures, cards or the like, one of which is indicated in dotted lines at 72 in Fig. 3 of the drawing, are adapted to drop when automatically disengaged from the endless picture holder and carrier 53.

In the use of my improved apparatus, as shown in the accompanying drawing, the main and supplemental frames are mounted on a suitable support or supports upon which the projector lanterns 5 are placed in the manner indicated in dotted lines in Figs. 1, 3 and 4 of the drawing, and with both the endless picture holder and carrier 53 and the strip or film 63 in operation the rotation of the shaft 13 by the crank 33 will rotate one of the rollers 52—60 to move the picture holder or carrier 53, or the strip or film 63 to bring a picture, object or the like in position beneath one of the projector lanterns 5, while the other of the parts 53—63 remains at a standstill, this operation being controlled by the segmental gear 34 which alternately engages the gears 57 and 61. It will be understood that when the picture holder and carrier 53, or the strip or film 63, is at a standstill the picture or object thereon or in connection therewith will be projected through the lantern in connection with which the same operates, and the electric circuit between the contacts belonging to or in circuit with such lantern will be closed as indicated at the left of Fig. 3 of the drawing, while the circuit through the other contacts will be broken as indicated at the right of Fig. 3.

It will be apparent that in the operation of the apparatus and as one picture is removed from the screen and the other picture projected thereon, the first named picture will gradually disappear on the screen, while the other picture will gradually appear, this result being accomplished by reason of the movable contact members 20 and 23 within the box 15 and the salt solution within said box acts as conductor of the electric circuits as the separate pairs of contacts within said box are moved toward and from each other in the rotation of the disk 27 and the electric lights or lamps within the projector lanterns 5 will be gradually turned on and off in the above operation.

It will be understood that the pictures, cards or the like 72 are fed into engagement with the endless picture holder and carrier 53, as indicated in dotted lines in Fig. 3, while the apparatus is in operation, and the pictures and the like on the strip or film 63 will be automatically brought into position. By providing adjustable rollers or spools 64 and 65, picture strips or film strips 63 bearing various subject-matter may be connected with the supplemental frame 45 at will.

It will also be seen that whenever desired a picture or other object mounted in a frame or on suitable support may be projected through the lantern 5 at the left of Fig. 3 of the drawing by mounting said frame or object and the support thereof in the grooves 49 of the transverse members 48 beneath the picture holder and carrier 53 when one of the apertures or spaces between the parts 55 and 56 is in the position shown in Fig. 3 or beneath the lantern.

It will also be apparent that I may use either one of the supplemental frames, or the endless picture holder and carrier and strip or film 63 mounted therein in connection with a single projector lantern, or both of the frames 44 and 45 with the mechanisms connected therewith may be employed as shown in the drawing, in which event, two projector lanterns are employed, and while I have shown a specific form of apparatus for carrying my invention into effect and have shown the apparatus as used in connection with a projector lantern, or lanterns of specific construction, and of a specific type, my invention is not necessarily limited to this use nor to the details of construction herein shown and described, and various changes therein and modifications thereof may be made, within the scope of the appended claims, without departing from the spirit of my invention or sacrificing its advantages.

Having fully described my invention, what I claim as new and desire to secure by Letters Patent, is:—

1. An apparatus of the class described comprising a suitable frame, a picture holder and carrier mounted in said frame, means for mounting a picture strip or film in said frame, means for alternately operating said picture holder and carrier and said strip or film to bring pictures, and objects in position to be projected, and means involving movable electric contact devices operating in a solution for dissolving the separate pictures in the operation of projecting the same upon a suitable screen.

2. An apparatus of the class described comprising a suitable frame, a picture holder and carrier mounted in said frame, means for mounting a picture strip or film in said frame, means for alternately operating said picture holder and carrier and said strip or film to bring pictures, and objects in position to be projected, means involving movable electric contact devices operating in a solution for dissolving the separate pictures in the operation of projecting the same upon a suitable screen, and means for operating said last named means in the operation of said picture holder and carrier and said strip or film.

3. An apparatus of the class described comprising a main frame, two supplemental frames detachably mounted in connection with the main frame, a picture holder and carrier mounted in one of the supplemental frames, means for detachably mounting a picture strip or film in the other supplemental frame, and means in the main frame and in operative connection with the picture holder and carrier and said strip or film in the separate supplemental frames for alternately operating the same whereby pictures, and objects may be projected onto a screen through projector lanterns mounted in connection with the separate supplemental frames.

4. An apparatus of the class described comprising a main frame, two supplemental frames detachably mounted in connection with the main frame, a picture holder and carrier mounted in one of the supplemental frames, means for detachably mounting a picture strip or film in the other supplemental frame, means in the main frame and in operative connection with the picture holder and carrier and said strip or film in the separate supplemental frames for alternately operating the same whereby pictures, and objects may be projected onto a screen through projector lanterns mounted in connection with the separate supplemental frames, a dissolving box member mounted in connection with the main frame and divided into separate compartments, electric contact devices mounted in said compartments, and means for moving one of the contact devices in each of said compartments alternately toward and from the other contact devices.

5. An apparatus of the class described comprising a main frame, two supplemental frames detachably mounted in connection with the main frame, a picture holder and carrier mounted in one of the supplemental frames, means for detachably mounting a picture strip or film in the other supplemental frame, means in the main frame and in operative connection with the picture holder and carrier and said strip or film in the separate supplemental frames for alternately operating the same whereby pictures, and objects may be projected onto a screen through projector lanterns mounted in connection with the separate supplemental frames, a dissolving box member mounted in connection with the main frame and divided into separate compartments, electric contact devices mounted in said compartments, and means for moving one of the contact devices in each of said compartments alternately toward and from the other contact devices to alternately dissolve the pictures projected through the lanterns employed in connection with the supplemental frames.

6. An apparatus of the class described comprising a suitable frame, an endless picture holder and carrier mounted in said frame, means for mounting a picture strip or film in said frame, two pairs of electric contact devices mounted in connection with the frame, means for alternately moving one of the contact devices in each pair toward and from the other contact devices, means for alternately operating the picture holder and carrier and said picture strip or film and for operating said contact devices to alternately project pictures onto a screen through suitable projector lanterns and for dissolving the pictures projected thereon.

7. An apparatus of the class described comprising a suitable frame, an endless picture holder and carrier mounted in said frame, means for mounting a picture strip or film in said frame, two pairs of electric contact devices mounted in connection with the frame, means for alternately moving one of the contact devices in each pair toward and from the other contact devices, means for alternately operating the picture holder and carrier and said picture strip or film and for operating said contact devices to alternately project pictures onto a screen through suitable projector lanterns and for dissolving the pictures projected thereon, and means for controlling the movement of a picture strip or film mounted in said frame.

8. An apparatus of the class described adapted for use in connection with projector lanterns employing electric light bulbs, comprising a suitable frame, an endless picture holder and carrier mounted in said frame, means for mounting a picture strip or film in said frame, means for alternately operating said picture holder and carrier and said first named means to alternately bring pictures in position to be projected through projector lanterns employed in connection with said endless picture holder and picture holding carrier and a picture strip or film, and means in said frames and in connection with which said endless picture holder and carrier operates whereby pictures or objects may be projected through the projector lantern employed in connection therewith.

9. An apparatus of the class described comprising a suitable frame adapted to be mounted in connection with two projector lanterns, means in said frame for supporting a picture strip or film which is adapted to operate in connection with one of said lanterns, a picture holder and carrier mounted in said frame and adapted to operate in connection with the other lantern, means for alternately operating said first named means and said picture holder and carrier to bring pictures in position to be projected through the separate lanterns, and other picture-holding means in juxtaposition to one of said lanterns whereby pictures, or objects may be projected through said lantern.

10. An apparatus of the class described adapted for use in connection with projector lanterns employing electric light bulbs, comprising a suitable frame, means in said frame for alternately bringing pictures and objects into position to be projected through the separate lanterns, electric contact devices mounted in a suitable solution and movable toward and from one another to gradually open and close the circuit to said bulbs for dissolving the pictures projected on a screen through the separate lanterns.

11. An apparatus of the class described comprising a suitable frame, a picture holder and carrier mounted in said frame and in connection with which separate and independent pictures are adapted to be mounted, means for supporting and operating a picture strip or film in said frame, and a means for alternately operating said picture holder and carrier and said first named means to bring pictures in said picture holder and carrier and on said strip or film in position to be projected.

In testimony that I claim the foregoing as my invention I have signed my name in presence of the subscribing witnesses this 20th day of March, 1920.

WILLIAM L. ISBILLS.

Witnesses:
C. E. MULREANY,
H. E. THOMPSON.